US006521884B1

(12) United States Patent
Breda

(10) Patent No.: US 6,521,884 B1
(45) Date of Patent: Feb. 18, 2003

(54) DISTANCE MEASURING DEVICE WITH MAGNETO-OPTICAL EFFECT AND MEASURING CHAIN INCORPORATING SAME

(75) Inventor: Jean-Marc Breda, Vendome (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/806,471

(22) PCT Filed: Oct. 8, 1999

(86) PCT No.: PCT/FR99/02417

§ 371 (c)(1),
(2), (4) Date: Apr. 9, 2001

(87) PCT Pub. No.: WO00/22378

PCT Pub. Date: Apr. 20, 2000

(30) Foreign Application Priority Data

Oct. 9, 1998 (FR) .............................................. 98 12686

(51) Int. Cl.$^7$ ................................................ G02F 1/01
(52) U.S. Cl. ..................... 250/225; 250/227.17; 324/96
(58) Field of Search ............................ 250/225, 227.17, 250/227.21, 231.1; 324/96, 174–175, 244.1, 260, 262

(56) References Cited

U.S. PATENT DOCUMENTS

| 4,931,635 A | * | 6/1990 | Toyama ...................... 250/225 |
| 5,149,962 A | | 9/1992 | Maurice |
| 5,202,746 A | * | 4/1993 | Sentsui et al. .............. 356/73.1 |
| 5,204,619 A | * | 4/1993 | Beigbeder et al. .......... 324/174 |
| 5,229,844 A | | 7/1993 | Breda |
| 5,408,092 A | * | 4/1995 | Maurice et al. ........ 250/227.21 |
| 5,859,531 A | * | 1/1999 | Maurice et al. ........ 324/207.13 |
| 6,040,899 A | | 3/2000 | Breda |
| 6,091,335 A | | 7/2000 | Breda et al. |
| 6,188,811 B1 | * | 2/2001 | Blake .......................... 385/12 |

FOREIGN PATENT DOCUMENTS

| EP | 0 226 652 | 7/1987 |
| EP | 0 323 031 | 7/1989 |
| EP | 0 437 404 | 7/1991 |
| FR | 2 619 909 | 3/1989 |

* cited by examiner

Primary Examiner—Kevin Pyo
Assistant Examiner—Seung C. Sohn
(74) Attorney, Agent, or Firm—Oblon, Spivak, McClelland, Maier & Neustadt, P.C.

(57) ABSTRACT

A magneto-optical effect distance measuring device and measuring rig incorporating the device. The device can measure the distance separating two members which can be displaced one with respect to the other by the magneto-optical effect. A permanent magnet is fixed on one of the members and an electro-optical device is fixed on the other member. The electro-optical device includes a diode emitting an optical beam. Further, a Faraday-effect magneto-optical film is disposed, on the one hand, between a polarizer and an analyser and, on the other hand, in the magnetic field of the magnet when the two members are in proximity to one another, the optical beam passing through the assembly. A diode receives the optical beam retransmitted by the analyzer so as to transform the luminous intensity of the beam into an electrical signal whose amplitude depends on the distance separating the two members when they are in proximity to one another. Such a device may find particular application to monitoring the closure of aircraft doors.

12 Claims, 2 Drawing Sheets

1

DISTANCE MEASURING DEVICE WITH MAGNETO-OPTICAL EFFECT AND MEASURING CHAIN INCORPORATING SAME

BACKGROUND OF THE INVENTION

The present invention relates to a magneto-optical effect distance measuring device and a measuring rig incorporating this device, these being more particularly adapted to the monitoring of the closing of aircraft doors.

The closing of the doors in an aircraft is at present signalled to the flight deck by virtue of micro-contacts disposed in the surround of the doors.

This device is often criticized for providing unreliable information which generates false alarms, the latter usually being due to mechanical or electrical impairments of the micro-contacts themselves or caused by deformations of the hull of the aircraft, which produce a defect in the sealing of the door to its casing when the door is closed and reduce the pressure exerted on the contacts.

Moreover, the all-or-nothing binary operation of the micro-contacts does not make it possible to advise the flight deck and the aircraft's internal pressurization system of the sealing of the doors, it being possible to determine this accurately only by measuring, along the entire perimeter of the doors, the distances which, in the closed position, separate the sills for supporting the doors on their casings.

To solve this problem it is possible to envisage the use of ultrasound sensors or optical sensors, but the use of these sensors requires wiring which increases the weight breakdown of aircraft. By way of indication, for a long-haul aircraft, the wiring up of 50 sensors requires not less than 4 kms of cabling, thereby increasing the weight breakdown by around 15 kgs if optical fibres are used, and by around 36 kgs and 52 kgs if coaxial cables or shielded pairs, respectively, are used.

The aim of the invention is to alleviate the aforesaid drawbacks.

SUMMARY OF THE INVENTION

Accordingly, the subject of the invention is a device for measuring the distance separating two members which can be displaced one with respect to the other by magneto-optical effect comprising a permanent magnet fixed on one of the members and an electro-optical device fixed on the other member, characterized in that the electro-optical device comprises:

a diode emitting an optical beam,
a Faraday-effect magneto-optical film disposed, on the one hand, between a polarizer and an analyser and, on the other hand, in the magnetic field of the magnet when the two members are in proximity to one another, the optical beam passing through the assembly,
and a photodiode receiving the optical beam retransmitted by the analyser so as to transform the luminous intensity of the beam into an electrical signal whose amplitude depends on the distance separating the two members when they are in proximity to one another.

The subject of the invention is also a rig for measuring distance between two members which can be displaced one with respect to the other, characterized in that it comprises a specified number N of sensors coupled by a single optical fibre to an emitting optical diode and a receiving photodiode, each sensor comprising a permanent magnet fixed on one of the members and an electro-optical device comprising:

a Faraday-effect magneto-optical film disposed, on the one hand, between a polarizer and an analyser and, on the other hand, in the magnetic field of the magnet when the two members are in proximity to one another, and an optical fibre of specified length which is different for each sensor coupled by a first end to the input of the polarizer and the output of the analyser, and coupled by its second end, by way of an optical coupler, to a first end of the single optical fibre for coupling the N sensors to the photo-emitting diode and to the receiving photodiode (15), the second end of the single optical fibre being coupled to the emitting diode and to the receiving photodiode.

According to another possible mode of implementation of the invention, in order to embody a sensor, it will be possible to use a magneto-optical film disposed between the polarizer and a return mirror for returning the beam emitted by the emitting diode to the polarizer, the return mirror and the polarizer having the role of analyser.

The device according to the invention has the advantage of employing only static opto-electronic elements, thereby imparting high reliability to the systems incorporating this device.

It also has the advantage that it makes it possible to measure, with an accuracy of around 1%, small spacings between mechanical members a few millimetres apart, this possibly allowing, when applied to an aircraft, effective monitoring of the latter's pressurization system as a function of the distances measured in the space located between the sill of the doors and their position of support on the opposite casings.

When applied to the construction of measuring rigs comprising several sensors, the invention has another advantage in that it makes it possible to use just a single optical fibre to remotely transmit the N items of information originating from the N sensors, this exhibiting an appreciable weight saving. Moreover, the use of an optical fibre as linking means also offers the possibility of transmitting other information on the same fibre, such as the temperature for example, or of integrating, without any particular adaptation, the measuring rig thus constructed into a fibre optic network.

The measuring rig according to the invention also has the advantage of being highly reliable since it makes it possible to detect any malfunctioning of an element of the rig which is manifested either through the appearance of a spurious signal, or through an abnormal amplitude of a signal.

Other characteristics and advantages of the invention will become apparent in the description which follows in conjunction with the appended drawings which represent:

DETAILED DESCRIPTION OF THE INVENTION

Figure 1:
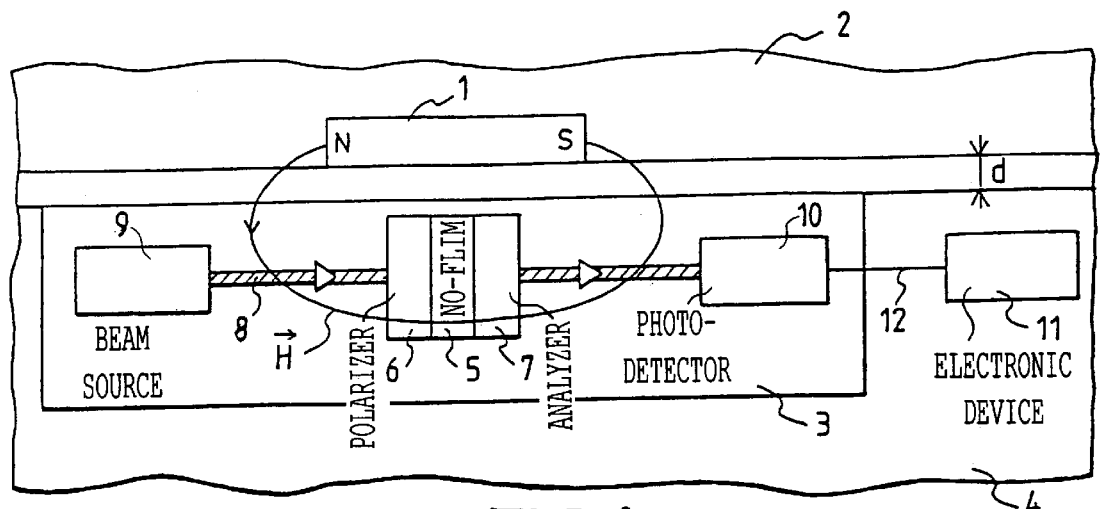
FIG. 1 is a basic diagram of a distance measuring device according to the invention.

The distance measuring device which is represented in FIG. 1 comprises a permanent magnet 1 secured to a movable member 2 and an electro-optical device 3 secured to a fixed frame 4.

The electro-optical device 3 comprises a Faraday-effect magneto-optical film 5, for example of the Y.I.G. (Yttrium-Iron-Garnet) type or of the Bi-Y.I.G. (Bismuth-Yttrium-Iron-Garnet) type which are commonly used in optical isolators, this film being disposed between a polarizer 6 and an analyser 7. The electro-optical device 3 exhibits the known property of producing a rotation of the plane of polarization of a light beam which passes through it parallel to the direction of the magnetic field which is applied to the film by the magnet 1. The angle of rotation a obtained obeys the known law of Vernet, this angle is proportional to the thickness L of the magneto-optical film 5, to the intensity H of the magnetic field applied by the magnet 1, and to a constant V, the so-called Verdet constant according to the relation:

After passing through the assembly consisting of the polarizer, the magneto-optical film and the analyser, the transmitted intensity $I_T$ is equal to:

$$I_T = I_O \cos^2 \alpha \qquad (2)$$

where $I_O$ is the initial intensity. Naturally, the relation (2) is true only if the axes of polarization of the polarizer and of the analyser are parallel and if the transmissions of the various elements are perfect, that is to say equal to 1.

In the case where the light performs an outward and return journey, passing through the magneto-optical film once in an outward direction and once in a return direction, the angle of rotation of the beam becomes doubled, thereby increasing the sensitivity.

A photo-emitting diode 9 of the light-emitting or laser type, for example, emits a beam 8 of light whose wavelengths are compatible with the magneto-optical films (1300 nm and 1550 nm for example) towards a receiving photo-diode 10. The beam 8 passes through the polarizer 6 and emerges from the latter after having passed successively through the magneto-optical film 5 and the analyser 7. The receiving photodiode 10 is coupled to an electronic processing device 11 by way of a linking cable 12.

Magnetic field lines H whose intensity depends on the distance which separates the magnet from the electro-optical device 3 are induced inside the magneto-optical film 5 by the permanent magnet 1.

When the polarized light which leaves the emitting diode 9 passes through the magneto-optical film 5, its plane of polarization rotates by the angle α whose value is dependent on the intensity H of the magnetic field and consequently on the distance which separates the magnet 1 from the electro-optical device 3. The luminous intensity of the light beam which exits the analyser 7 also depends on the angle of rotation α of the plane of polarization, its value is converted into an electrical magnitude which is transmitted to the processing device 11. The latter determines, as a function of the electrical magnitude which it receives, the distance which separates the movable objects 2 from the frame 4.

Figure 2:
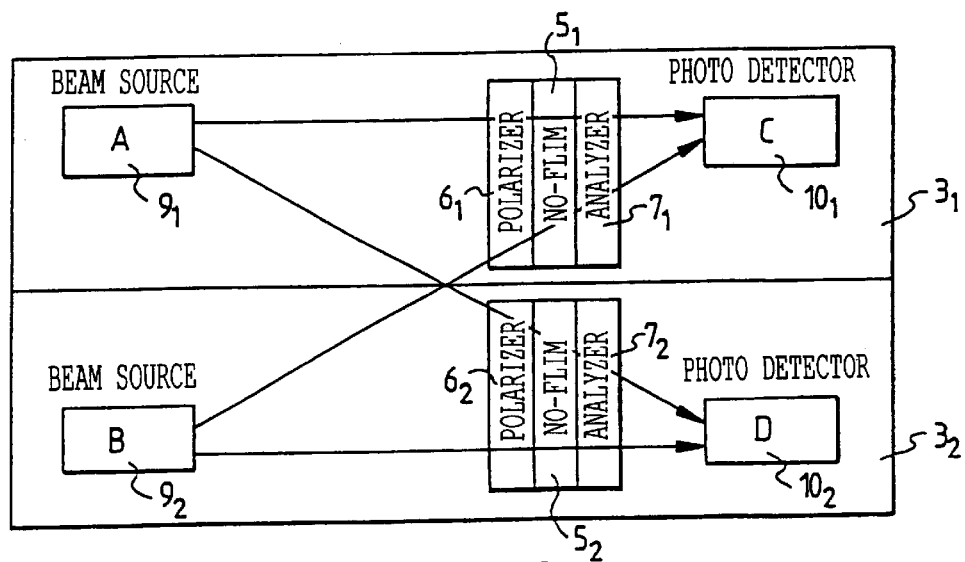
FIG. 2 is a first exemplary implementation of devices according to the invention making it possible to compensate for the variations in sensitivity of the various elements making up each device as a function of temperature.

The embodiment of FIG. 2 takes account of the variations in sensitivity of the various elements making up the electro-optical device 3 as a function of temperature. This embodiment implements two electro-optical devices $3_1$ and $3_2$.

In FIG. 2 the elements which are the counterparts of those of FIG. 1 bear the same references, although assigned an index equal to 1 or 2 to indicate that they belong to one or other of the modules $3_1$ and $3_2$.

Unlike in the case of the device of FIG. 1, each of the two emitting diodes $9_1$ and $9_2$ emits towards the receiving photodiodes $10_1$, and $10_2$. In the following relations, A and B designate the emitting photodiodes $9_1$ and $9_2$, and C and D designate the receiving photodiodes $10_1$ and $10_2$.

The sequencing of the device is as follows.

Initially, only the emitter $9_1$ is activated and the receiving photodiodes therefore receive two signals denoted $S_{AC}$ and $S_{AD}$ such that:

$$S_{AC} = K_C \times K_A \times T_d$$

$$S_{AD} = K_D \times K_A \times T_{d+do}$$

where $K_C$, $K_D$, are constants which depend on the receiving photodiodes $10_1$ and $10_2$ $K_A$, $K_B$ are constants which depend on the emitting photodiodes $9_1$ and $9_2$ $T_d$, $T_{d+do}$ are the transmission factors of the magneto-optical films at the distances d and d+$d_o$ separating the movable member 2 from the frame 4.

Subsequently, the emitter $9_2$ is activated and the photodetectors $10_1$ and $10_2$ receive two signals denoted $S_{BC}$ and $S_{BD}$ such that:

$$S_{BC} = K_B \times K_C \times T_d$$

$$S_{BD} = K_B \times K_D \times T_{d+do}$$

By taking the ratio:

$$R = (S_{AD} \times S_{BD})/(S_{AC} \times S_{BC}) = (T_{d+do})^2 (K_d)^2 / (T_d)(K_c)^2$$

it is apparent that R is independent of the emission and reception parameters. The distance d can be deduced by knowing R from do.

Figure 3:
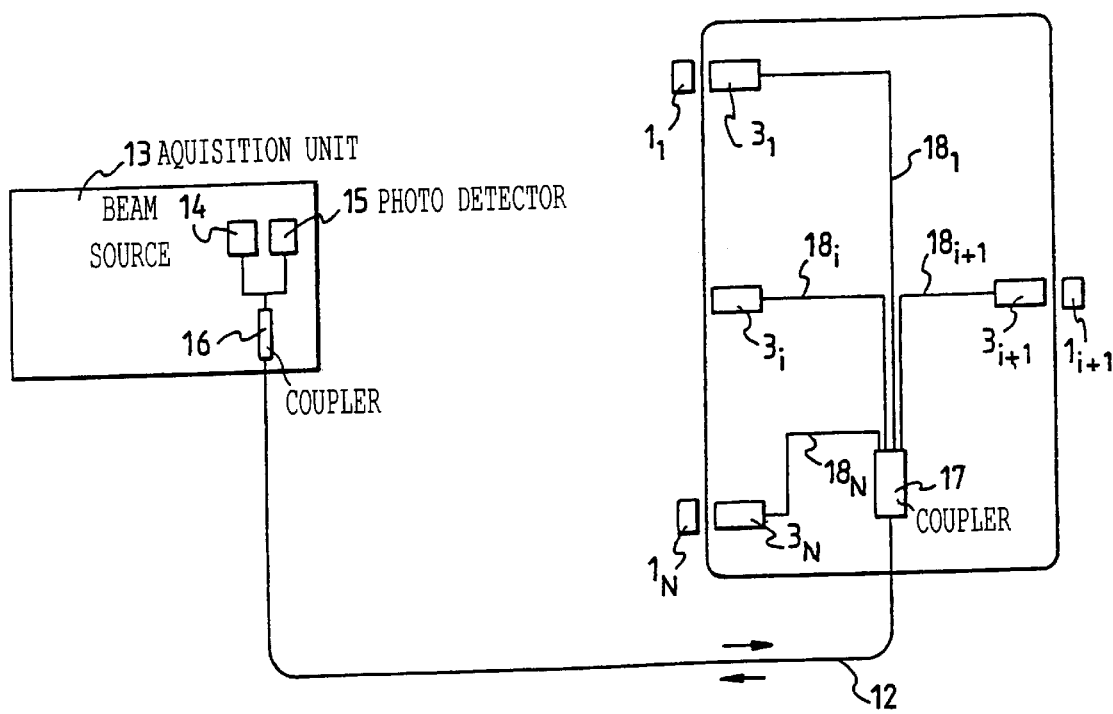
FIG. 3 is a distance measuring rig implementing various devices according to the invention in conjunction with a remotely placed acquisition device.

The fibre optic measuring rig which is represented in FIG. 3 comprises N sensors composed of electro-optical devices $3_1 \ldots 3_N$ of the type of those represented in FIGS. 1 and 2. The N sensors are coupled to an acquisition unit 13 by way of a multimode fibre optic linking cable 12. The acquisition unit 13 comprises an optical emitter 14 composed of a photo-emitting diode of light-emitting or laser type, for example, and of a receiving photodiode 15, the assembly being coupled to a Y optical coupler 16. A 1-N optical coupler 17 carries out the coupling of all the N sensors to the cable 12.

The manner of operation of the measuring rig is of the type of that known by the abbreviation O.T.D.R standing for "Optical Time Domain Reflectometer". Within the context of FIG. 3, the emitter 14 emits a very intense and very brief light pulse of a few nanoseconds, for example, on the cable 12 by way of the coupler 16. This pulse is applied to the input of the coupler 17, where it is separated into N pulses of equal intensities. Each of the N pulses is transmitted to an electro-optical device $3_1$ to $3_N$.

Figure 4:
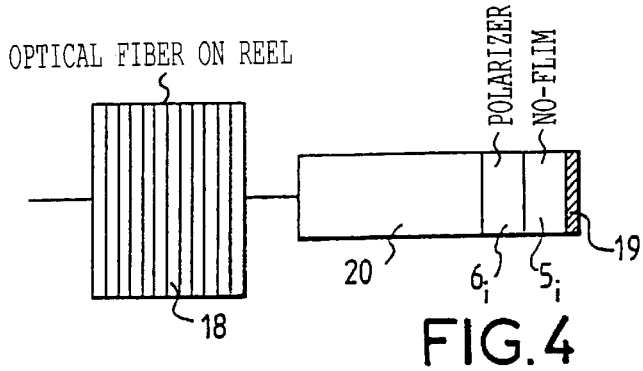
FIG. 4 is an embodiment of a device according to the invention operating according to the basic principle of FIG. 1.

An implementation of an electro-optical device applied to this mode of operation is shown in FIG. 4. According to this embodiment, each sensor comprises a magneto-optical film $5i$ lying between a return mirror 19 and a polarizer $6_i$ which also acts as analyser. A lens 20 is interposed between a first end of a reel 18 of optical fibre and the polarizer $6_i$. The optical fibre wound around the reel 18 possesses a length which depends on the index number of the sensor to which it is fitted. By way of example, it will be possible to choose the first sensor to comprise an optical fibre L metres long, the second to contain 2L metres of it etc . . . and the $N^{th}$ to contain a length NL metres of it. This arrangement enables each sensor to reflect the light with a luminous intensity whose amplitude is representative of the proximity of the magnet 1 to the electro-optical device associated with it. In this way the coupler 17 receives, after the pulses have passed through the N sensors, N temporally shifted reflected pulses whose amplitudes are representative of the various proximities. In order to calibrate the reflected amplitudes, one of the sensors comprising an electro-optical device $3_i$ is designated to serve as reference and to provide a constant proximity distance value.

The N pulses pass back in succession through the optical linking cable 12 and the coupler 16 so as to arrive at the receiving photodiode 15. The processing device 11 then analyses the amplitudes of the N signals obtained at the output of the receiving photodiode 15 so as to transform them into proximity value.

According to yet another embodiment of the invention, the polarizers can be replaced by using polarization-maintaining single-mode optical fibres in place of multi-mode fibres. In this case it is necessary to use a source emitting polarized light, and to place an analyser at the receiving end in front of the receiving diode.

What is claimed is:

1. Device for measuring the distance separating two members which can be displaced one with respect to the other comprising a permanent magnet fixed on a first surface of one of the members and a first electro-optical device fixed on a second surface of the other member, the first electro-optical device comprising:
   a beam source configured to emit an optical beam along a first path extending along the second surface and leading to an optical assembly,
   a Faraday-effect magneto-optical film disposed with optical components configured to act as a polarizer and an analyser along a second path inside the optical assembly, the Faraday-effect magneto-optical film also being disposed in a magnetic field of the permanent magnet when the first and second surfaces of the two members are in proximity to one another, the optical beam entering the optical assembly and traveling along the second path to interact with the Faraday-effect magneto-optical film and the optical components and then exiting from the optical assembly, and
   a photodetector disposed to receive the optical beam exiting from the optical assembly and configured to transform the optical beam luminous intensity into an electric signal whose amplitude depends on the distance separating the first and second surfaces of the two members when they are proximate to one another.

2. The device according to claim 1, further comprising a second electro-optical device identical to the first electro-optical device and also fixed on the second surface, wherein the identical electro-optical devices provide two optical beams that illuminate the two photodetectors of the two electro-optical devices after passing through the two optical assemblies including the two Faraday-effect magneto-optical films and the optical components of each identical electro-optical device.

3. The device according to claim 1, wherein the Faraday-effect magneto-optical film is disposed between the optical component configured to act as the polarizer and a return mirror configured to reflect the optical beam back along the second optical path to again interact with the optical component configured to act as polarizer so that the return mirror and the optical component configured to act as the polarizer together form the optical component configured to act as the analyzer.

4. The device according to claim 1, wherein one of the members is an aircraft door.

5. Rig for measuring distance between two members which can be displaced one with respect to the other, comprising:

a source configured to emit an optical beam;
   a single optical fiber coupled at a first end to said source to receive and transmit the optical beam along the single optical fiber;
   a photodetector coupled to said first end of the single optical fiber and configured to transform the luminous intensity of the optical beam received from a return of the optical beam transmitted along the single optical fiber into an electrical signal whose amplitude depends on the distance separating the two members when they are in proximity to one another
   a specified number N of magneto-optical effect sensors coupled to a second end of the single optical fiber, each sensor comprising a permanent magnet fixed on a first one of the members and an electro-optical device fixed on a second one of the members, each electro-optical device comprising,
      a Faraday-effect magneto-optical film disposed along an optical path in the electro-optical device between a polarizer and a reflector, the Faraday-effect magneto-optical film also being disposed in the magnetic field of the permanent magnet when the two members are in proximity to one another, the optical beam being transmitted from the single optical fiber along the optical path through the polarizer and the Faraday-effect magneto-optical film to the reflector to be reflected and returned through the polarizer acting as an analyser and back to the single optical fiber, and
      a sensor optical fiber of specified length which is different for each sensor optical fiber of each electro-optical device so as to provide a different temporal shift for each sensor optical fiber, with each sensor optical fiber being coupled at a first sensor optical fiber end to the polarizer and coupled at a second sensor optical fiber end to the second end of the single optical fiber.

6. The rig according to claim 5, wherein the lengths of each of the sensor optical fibers of the sensors are all different from one another so as to temporally separate the signals provided by each electro-optical device in response to a single excitation signal applied to the source configured to emit an optical beam pulse as the optical beam.

7. The rig according to claim 6, wherein the lengths of the optical fibers are chosen to be proportional by an integer number to the length L of the shortest sensor optical fiber.

8. The rig according to claim 7, wherein the single excitation signal is only a few nanoseconds induration.

9. The rig according to claim 5, wherein one of the sensors is configured to provide a constant proximity distance value as a reference value.

10. The rig according to claim 5, wherein polarizer in each sensor is provided by a polarization-maintaining single-mode optical fibers and the source configured to emit an optical beam is further configured as a source emitting polarized light and an analyser is disposed at the first end of the single optical fiber in front of the photodetector.

11. The rig according to claim 5, wherein a lens is interposed between the polarizer and each sensor optical fiber.

12. The rig according to claim 5, wherein one of the members is an aircraft door.

* * * * *